United States Patent

Lamerdin et al.

[11] Patent Number: 5,734,095
[45] Date of Patent: Mar. 31, 1998

[54] DEVICE FOR MEASURING THE BIAS FORCE BETWEEN TWO OBJECTS

[75] Inventors: Werner Lamerdin, Wiesloch; Dieter Zimmermann, Leimen, both of Germany

[73] Assignee: Heidelberger Druckmaschinen AG, Heidelberg, Germany

[21] Appl. No.: 543,387

[22] Filed: Oct. 16, 1995

[30] Foreign Application Priority Data

Oct. 15, 1994 [DE] Germany ............... 44 37 006.7

[51] Int. Cl.$^6$ ............... B41F 33/00; B41F 13/26; G01M 3/02
[52] U.S. Cl. ............... 73/37; 355/213; 355/295; 73/37.9
[58] Field of Search ............... 73/37, 37.9; 355/290, 355/295, 213

[56] References Cited

U.S. PATENT DOCUMENTS

| | | | |
|---|---|---|---|
| 2,592,269 | 4/1952 | Getz | 56/1 |
| 2,592,569 | 4/1952 | Henderson | 73/228 |
| 3,418,850 | 12/1968 | Goddin | 73/141 |
| 3,760,637 | 9/1973 | Budinger et al. | 73/141 R |
| 3,973,844 | 8/1976 | McCarroll | 355/3 R |
| 4,662,213 | 5/1987 | Handy et al. | 73/37 |
| 4,958,195 | 9/1990 | Firth, III et al. | 355/290 |
| 5,048,330 | 9/1991 | Link, Jr. et al. | 73/168 |
| 5,255,557 | 10/1993 | Ihara et al. | 73/37 |
| 5,346,236 | 9/1994 | Ohma | 280/276 |
| 5,351,562 | 10/1994 | Scott | 73/37 |
| 5,624,299 | 4/1997 | Shendon | 451/28 |

FOREIGN PATENT DOCUMENTS

| | | |
|---|---|---|
| 0023541 | 2/1981 | European Pat. Off. |
| 2929694 | 2/1981 | Germany. |
| 3101742 | 8/1982 | Germany. |
| 3424732 | 11/1985 | Germany. |
| 4203940 | 2/1993 | Germany. |
| 62316027 | 6/1989 | Japan. |

Primary Examiner—Hezron E. Williams
Assistant Examiner—J. David Wiggins
Attorney, Agent, or Firm—Herbert L. Lerner; Laurence A. Greenberg

[57] ABSTRACT

The bias force between two objects is measured with an expansion element which is adapted to be inserted between the two objects. The expansion element is formed with a flexible contact surface for contacting the objects. The flexible contact surface is formed by a flexible envelope of a pressure cushion. A pressure source is in fluidic communication with the pressure cushion. The pressure in the expansion element is a measure of a magnitude of the bias force between the two objects. The device is particularly suited for measuring the bias force between two mutually contacting cylinder bearers in a rotary printing machine. The expansion element is thereby inserted into a gap formed between two cylinders and it is thereupon subjected to pressure from the pressure source, which forces the cylinders apart until a gap appears between the cylinder bearers. The pressure measured at that instant corresponds to the magnitude of the bias force between the cylinder bearers.

13 Claims, 3 Drawing Sheets

DEVICE FOR MEASURING THE BIAS FORCE BETWEEN TWO OBJECTS

BACKGROUND OF THE INVENTION

FIELD OF THE INVENTION

The invention relates to a device for measuring the bias or preload between two objects which are in mutual contact, particularly between cylinder bearers in rotary printing machines, whereby the bearers are in operative contact with each other; the measurement is thereby effected with an expansion element, which contacts the objects with a contact surface and which is connectible to a pressure source, and whereby the pressure of the expansion element represents a measure of the magnitude of the bias force.

A device of the above-mentioned kind is known from the German patent publication 31 01 742. The device comprises a bottom part and a top part, between which parts is formed a pressure chamber, such that the two parts can be forced apart. The top surface of the top part and the bottom surface of the bottom part are formed with contours which are adapted to the contours of the objects which are to be subjected to the pressure measurement. This has the result that a large area is subjected to pressure. Undesireable pressure marks are prevented in this manner. There is, however, the disadvantage that the device is not generically usable, because it must be individually matched to the contour of the objects that are to be subjected to the pressure measurement. Furthermore, there is the disadvantage that the bottom and top parts of that prior art device cannot be joined together until they have been inserted into the gap between the objects that are to be subjected to pressure. Assembly operations in the gap are time-consuming and elaborate and can only be carried out by experienced persons.

SUMMARY OF THE INVENTION

It is accordingly an object of the invention to provide a device for measuring the bias force between two objects, which overcomes the above-mentioned disadvantages of the heretofore-known devices and methods of this general type and which is flexible in its use, which is generically applicable to various systems, and which is of a simple construction.

With the foregoing and other objects in view there is provided, in accordance with the invention, a device for measuring a bias force between two objects, comprising:

an expansion element adapted to be inserted between two objects;

the expansion element being formed with a flexible contact surface for contacting the objects, the flexible contact surface being formed by a flexible envelope of a pressure cushion; and a pressure source in fluidic communication with the pressure cushion of the expansion element;

wherein a pressure in the expansion element represents a measure of a magnitude of the bias force between the two objects.

In other words, the object of the invention is solved in that the contact surface is formed by a flexible envelope of a pressure cushion. When the pressure is applied, the flexibility of the envelope, firstly, allows the pressure cushion to swell up so as to exert pressure on the objects and, secondly, the pressure cushion adapts very exactly to the shape contour of the objects. Nevertheless, it forms a defined compressive load per unit area. There is, therefore, positive form-fit contact, with the result that it is possible to dispense with especially shaped, expensive pressure shells or the like, such as those required in the prior art.

In accordance with an added feature of the invention, the expansion element is adapted to be inserted into a gap formed between two cylinders of a rotary printing machine while respective cylinder bearers are in operative contact with one another, and the pressure in the expansion element is gradually increased until the gap first enlarges, at which instant the measured pressure represents the magnitude of the bias force between the cylinder bearers.

The cylinders of the rotary printing machine have a given width and, in accordance with yet an added feature of the invention, the pressure cushion has a length corresponding to the given width such that the pressure cushion extends approximately across the entire width of the cylinders of the rotary printing machine. This leads to a uniform application of pressure to the cylinders and prevents tilting or the like.

In accordance with an additional feature of the invention, the flexible envelope is a formed of sheet metal or metal foil. It should be understood, however, that it is also possible to employ materials other than metal, such as appropriate plastics.

In accordance with a further feature of the invention, the pressure cushion defines a carrying body, the carrying body having mutually opposite sides with cushion surfaces of the flexible envelope, and the cushion surfaces defining a pressure chamber therebetween, and further comprising a pressure connection issuing into the pressure chamber and being connectible to the pressure source. The carrying body may thereby have a penetration with two sides formed therein to accommodate such pressure connection, the penetration forming a part of the pressure chamber, and including a flexible covering envelope disposed on each of the two sides of the penetration. The flexible covering envelope, by way of example, is a one-piece cover plate or two cover plates each disposed on a respective one of the two sides. The pressure connection, which issues into the pressure chamber, allows the entry of a medium supplied from the pressure source, such as hydraulic oil. This subjects the cover plates to pressure from the inside, with the result that the cover plates are able to swell outwards and thus subject the objects to pressure for the measurement.

In accordance with again an added feature of the invention, the device is provided with a pressure conduit fluidically connecting the pressure source to the pressure cushion, the pressure conduit together with the pressure cushion and the pressure source forming a closed-loop pressure system.

In accordance with again an additional feature of the invention, the pressure cushion further comprises a clamping mount disposed on one side thereof, the clamping mount having clamping cheeks, and the carrying body being mounted between the clamping cheeks. One of the cheeks is thereby formed with a pressure-supply opening and the pressure conduit is joined to the pressure-supply opening.

Other features which are considered as characteristic for the invention are set forth in the appended claims.

Although the invention is illustrated and described herein as embodied in a device for measuring the bias force between two objects, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best under-

DESCRIPTION OF THE PREFERRED EMBODIMENTS

Figure 1:
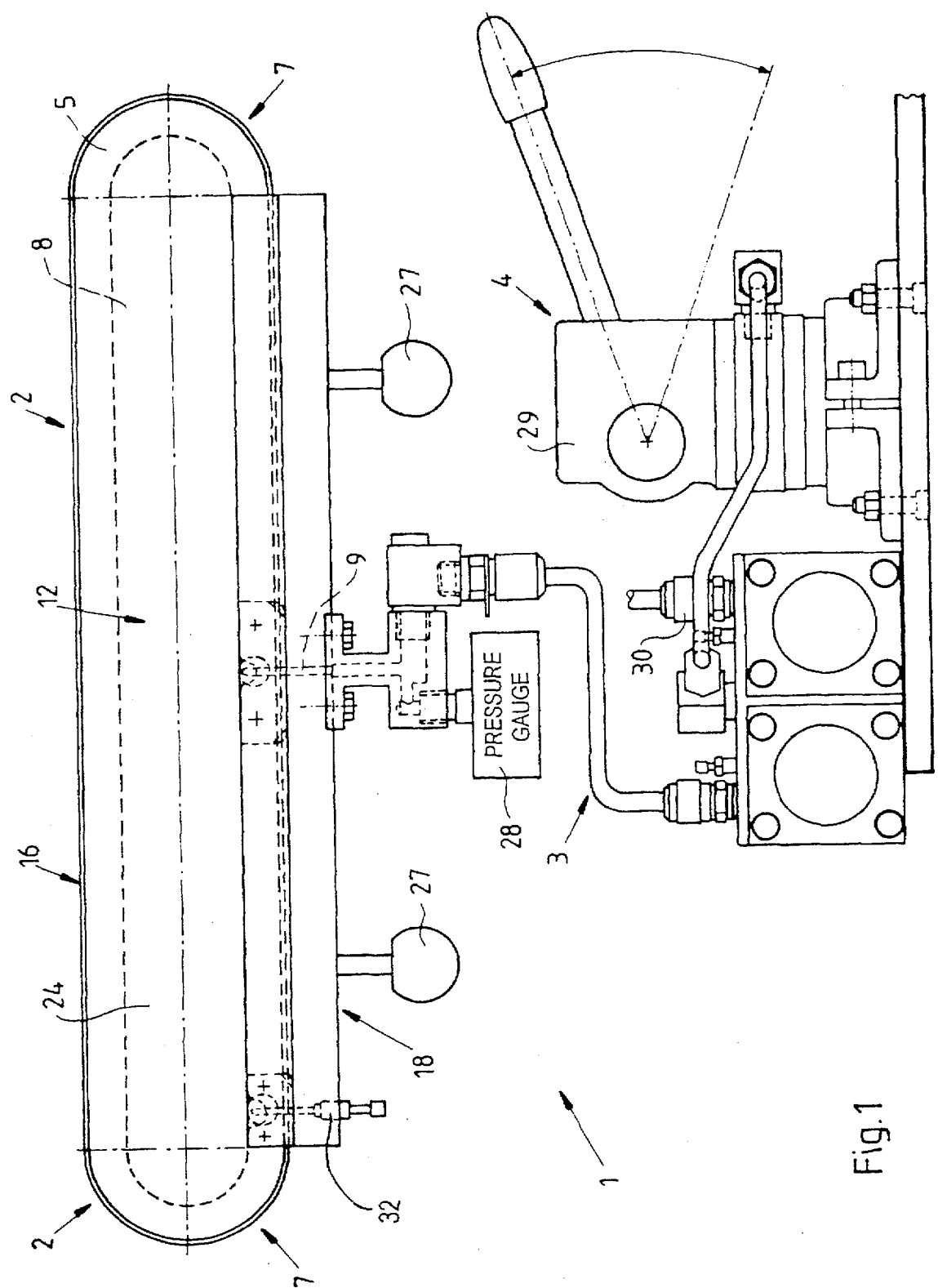
FIG. 1 is a schematic, partly sectional view of a device for measuring the bias force between two contacting objects.

Referring now to the figures of the drawing in detail and first, particularly, to FIG. 1 thereof, there is seen a device 1 for measuring the bias between two (preferably contacting) objects. The device comprises a pressure cushion 2, which communicates fluidically with a pressure source 4 through the intermediary of a pressure conduit 3.

Figure 2:
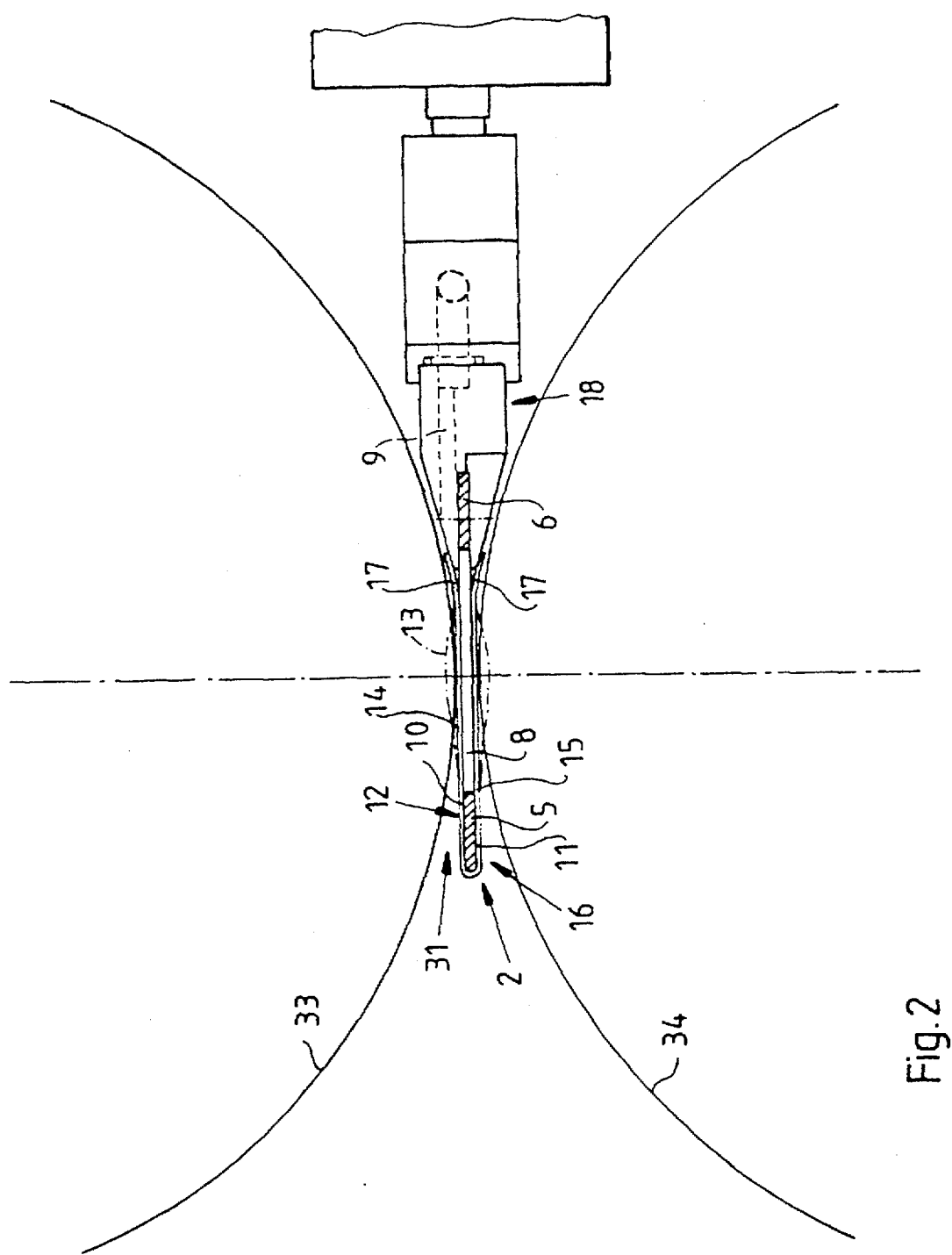
FIG. 2 is a partly sectional side-elevational view of a pressure cushion inserted into a gap between the objects.

With reference to FIGS. 1 and 2, the pressure cushion 2 comprises a carrying body 5 in the form of a plate 6, particularly a metal plate, and, as shown in FIG. 1, having an elongated shape with rounded end regions 7. The plate 6 is penetrated by a chamber 8, into which joins a pressure-supply opening 9. The pressure-supply opening 9 is connected to the pressure connection 3. Disposed on mutually opposite sides 10 and 11 of the carrying body 5 is a flexible envelope 12, which is part of the pressure cushion 2 and—when pressure is applied by means of a pressure medium supplied from the pressure source 4, such as hydraulic oil—allows the swelling-up of the pressure cushion 2. This swelling-up is indicated by the dash-dotted line 13 in FIG. 2. The flexible envelope 12 is preferably, but not necessarily, formed of a metal sheet or a metal foil. Preferably, the flexible envelope 12 is formed by cover plates 14 and 15, which are situated on the two sides 10 and 11 of the carrying body 5. The edges of the cover plates 14 and 15 are thereby welded to the carrying body 5. In a preferred embodiment, the penetrating chamber 8 in the plate 6 is cut with a laser and the cover plates 14 and 15 are laser-welded.

According to the exemplary embodiment shown in FIG. 2, the flexible envelope 12 extends in one piece over the free end 16 of the carrying body 5; that is, it is not necessary the two sides 10 and 11 are each covered with a separate flexible envelope, but the envelope 12 is a one-piece envelope.

Figure 3:
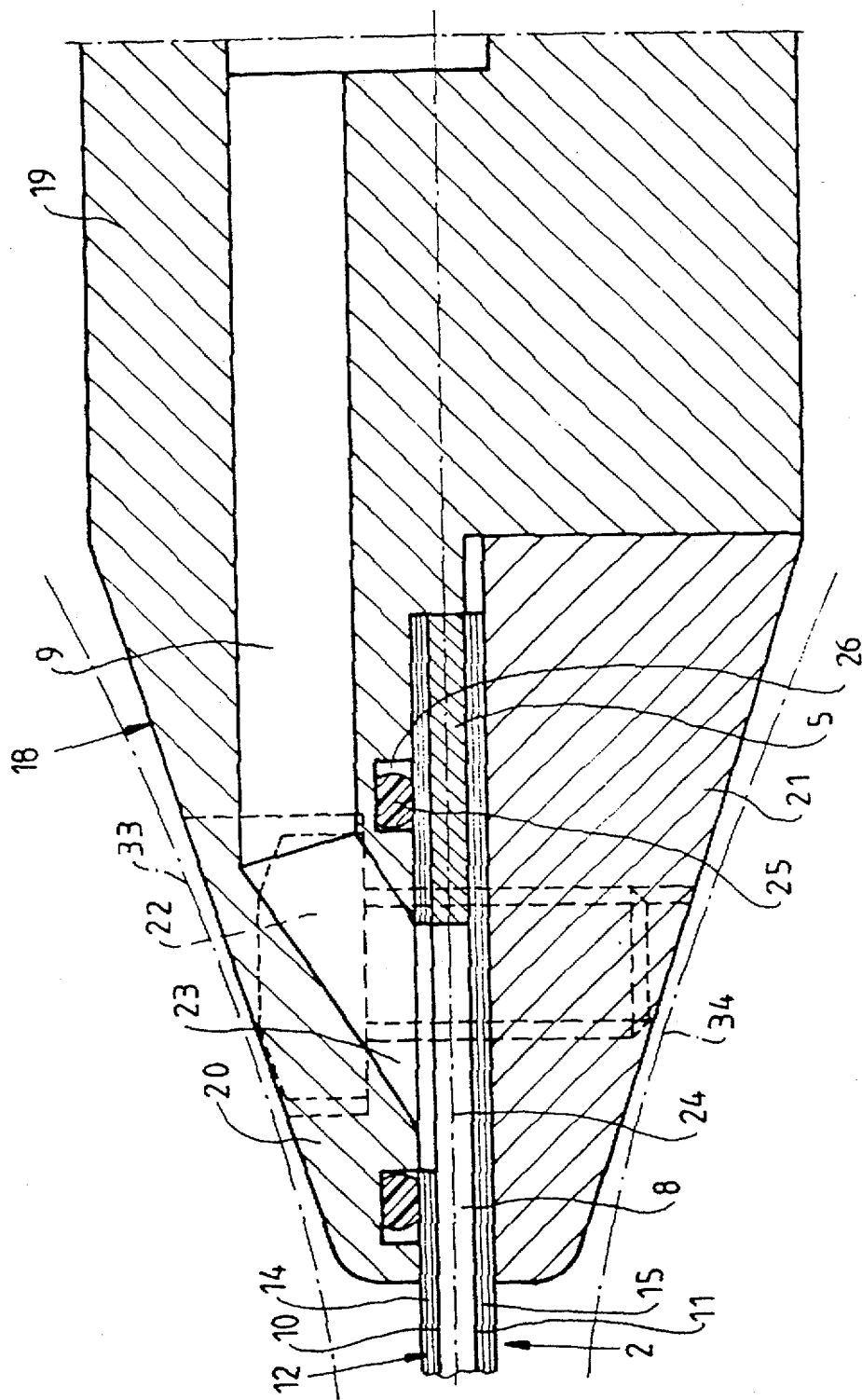
FIG. 3 is a sectional view through a clamping mount of the device.

Also with reference to FIG. 2, the end regions 17 of the one-piece cover plates may be welded to parts of the device 1. As shown in FIG. 3, however, it is also possible for the cover plates 14 and 15 to be mounted, together with the carrying body 5, in a clamping mount 18. For this purpose, the clamping mount 18 comprises a base body 19 with a clamping cheek 20. A further clamping cheek 21 may be fixed to the base body 19 by means of a suitable connection, for example a threaded bolt 22, and be braced to the other clamping cheek 20. As shown in FIG. 3, the cover plates 14 and 15 and the carrying body 5 situated between the cover plates 14 and 15, are braced between the two clamping cheeks 20, 21 in the region of a side of the pressure cushion 2. The pressure-supply hole 9 joins into the clamping cheek 20, which belongs to the base body 19. The mouth 23 of the pressure-supply hole 9 communicates with the penetrating chamber 8, the penetrating chamber 8 forming a pressure chamber 24. Preferably, the mouth 23 is surrounded by a ring seal 25 in the form of an O-ring which lies in a ring groove 26 formed in the clamping cheek 20. A seal is therefore provided with respect to the pressure cushion 2.

Again with reference to FIG. 1, there are disposed handgrips 27 on the mounting holder 18 which facilitate the handling of the pressure cushion 2. Furthermore, the pressure-supply opening 9 is connected to a pressure gauge 28, which enables a reading of the pressure. The pressure source 4 comprises a pump 29, with which hydraulic oil is pumped. While FIG. 1 shows only one pressure cushion 2 connected to the pump 29. It is also possible, however, for further pressure cushions 2 to be connected. One or more connection fittings 30 are provided for this purpose.

If, for example, the cylinder bearer pressure of cylinders in a rotary printing machine are to be measured, then according to FIG. 2, the pressure cushion 2 is brought between the cylinders (e.g. a plate cylinder 33 and a rubber-blanket cylinder 34), whereby the cylinders are in mutual engagement. The mutual engagement has the effect that the cylinder bearers are in operative contact with each other, i.e. they are in mutually biassed contact with each other. The gap 31 allowing the pressure cushion 2 to be inserted is available because there is no rubber blanket on the rubber-blanket cylinder 34 and no printing plate is disposed on the plate cylinder 33. When, after insertion, the pressure cushion 2 is made to swell up by means of the pressure source 4, the pressure cushion 2 comes into contact with the cylinders, preferably over the entire length thereof. The pressure is then increased until the cylinder bearers come out of contact. The disengaged position of the bearer rings can be detected, for example, when a light gap forms between the cylinder bearers. The pressure indicated on the pressure gauge 28 thereby is a measure of the compressive load on the cylinder bearers.

If, for example, the engineer finds that the compressive load on the cylinder bearers is too low, he will, after releasing the pressure cushion 2, increase the compressive load on the cylinder bearers and then carry out the measurement once again using the device 1. The process may be repeated until the desired cylinder-bearer compressive load has been set. In order to release the pressure from the pressure cushion 2, it is merely necessary to bring the pressure source 4 into an operating mode that allows the pressure medium to flow back. Prior to use, the device should be evacuated of any air which may be present in the cushion. The cushion may be bled through a bleed valve 32 (FIG. 1) which communicates with the pressure chamber 24.

Due to the fact that the pressure cushion 2 according to the invention deforms according to and optimally hugs the outer cylindrical surfaces of the rotary printing press cylinders 33 and 34, there is no danger of damage. Furthermore, one and the same pressure cushion 2 may be used for different radii of the rotary printing press cylinders. The device according to the invention is very light and it is simple to operate.

Hydraulic oil has already been mentioned as a pressure medium. However, it is also possible, for example, to use compressed air. It should be understood that a compressor may be employed as a pressure source. Such a compressor preferably comprises a pressure reducer. It is also conceivable to use an hydraulic pump.

The pressure cushion 2 is preferably made of stainless steel, such as the Nirosta steel type. Not illustrated in FIGS. 1 to 3 is a bit stop, which allows the pressure cushion 2 to be inserted with positional accuracy between the cylinders of the rotary printing press. It is readily possible, for example, to achieve pressure displacements in the range between one-tenth millimeter and one millimeter, pressures of below 25 bar being sufficient. If the device 1 is to be inserted into a gap that is larger than the working range of the device 1, it is possible for packing strips or, alternatively, protective strips to be inserted into the gap in order to adapt the thickness. The device 1 according to the invention is only of a very small thickness, which may, for example, be approximately 2 millimeters. Insofar as it is intended to use the device 1 for differently sized cylinder diameters on rotary printing press cylinders, it is not necessary to exchange parts. The different cylinder diameters only call for a change in the pressure. The pressures may be predefined and stored in a table or the like.

We claim:

1. A device for measuring a bias force between two objects, comprising:

an expansion element adapted to be inserted between two objects;

said expansion element being formed with a flexible contact surface for contacting the objects, said flexible contact surface being formed by a flexible envelope of a pressure cushion, said flexible envelope being formed of metal; and a pressure source in fluidic communication with said pressure cushion of said expansion element;

wherein a pressure measured in said expansion element represents a measure of a magnitude of the bias force between the two objects.

2. The device according to claim 1, wherein said expansion element is adapted to be inserted into a gap formed between two cylinders of a rotary printing machine while respective cylinder bearers are in operative contact with one another, and the pressure in said expansion element represents the magnitude of the bias force between the cylinder bearers.

3. The device according to claim 1, wherein the envelope is formed of one of metal sheets and metal foil.

4. The device according to claim 1, wherein said pressure cushion defines a carrying body, said carrying body having mutually opposite sides with cushion surfaces of said flexible envelope, and said cushion surfaces defining a pressure chamber therebetween, and further comprising a pressure connection issuing into said pressure chamber and being connectible to said pressure source.

5. The device according to claim 4, wherein said carrying body has a penetration with two sides formed therein to accomodate said pressure connection, said penetration forming a part of said pressure chamber, and including a flexible covering envelope disposed on each of said two sides of said penetration.

6. The device according to claim 5, wherein said flexible covering envelope is a one-piece cover plate.

7. The device according to claim 5, wherein said flexible covering envelope is formed of two cover plates each disposed on a respective one of said two sides.

8. The device according to claim 1, which further comprises a pressure conduit fluidically connecting said pressure source to said pressure cushion, said pressure conduit together with said pressure cushion and said pressure source forming a closed-loop pressure system.

9. The device according to claim 4, wherein said pressure cushion further comprises a clamping mount disposed on one side thereof, said clamping mount having clamping cheeks, and said carrying body being mounted between said clamping cheeks.

10. The device according to claim 9, wherein one of said cheeks is formed with a pressure-supply opening and said pressure connection is joined to said pressure-supply opening.

11. The device according to claim 4, wherein said pressure cushion further comprises a clamping mount disposed on one side thereof, said clamping mount having clamping cheeks, and said carrying body and said flexible envelope being mounted between said clamping cheeks.

12. The device according to claim 11, wherein one of said cheeks is formed with a pressure-supply opening and said pressure conduit is joined to said pressure-supply opening.

13. The device according to claim 2, wherein the cylinders of the rotary printing machine have a given width, and said pressure cushion has a length corresponding to the given width such that said pressure cushion extends approximately across the entire width of the cylinders of the rotary printing machine.

* * * * *